Nov. 1, 1932.    B. T. BJORNSON    1,885,324
VENDING MACHINE
Filed April 5, 1930    2 Sheets-Sheet 2
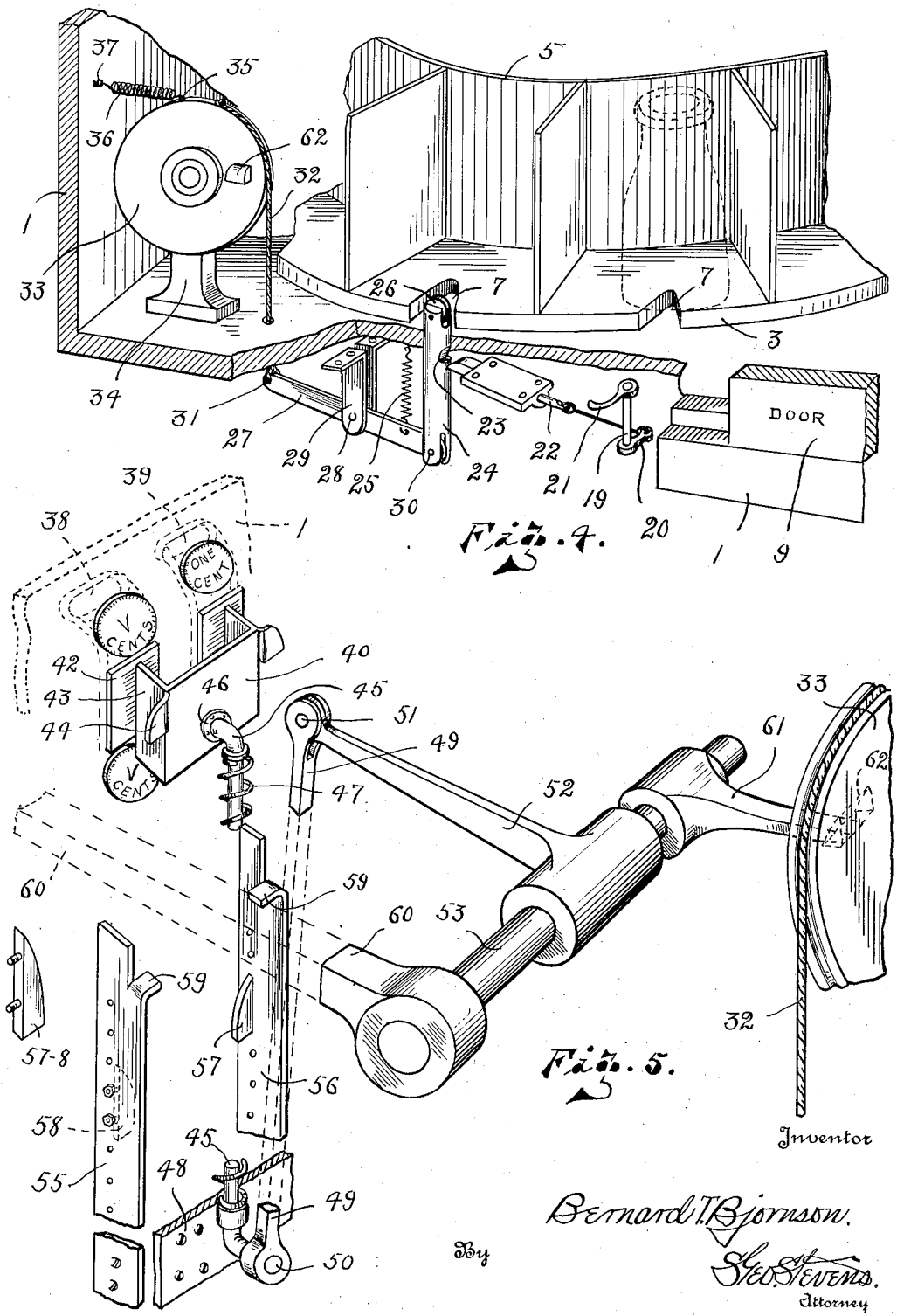

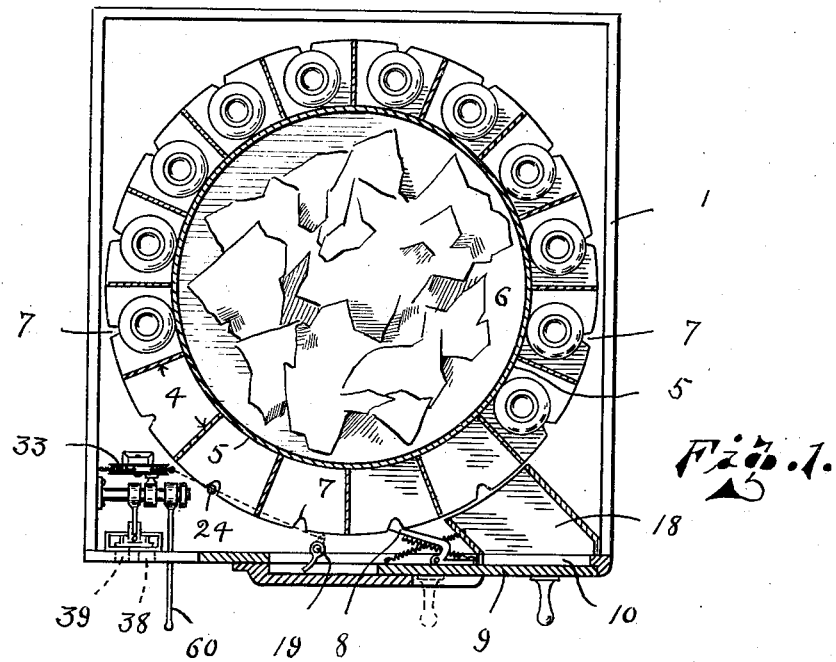
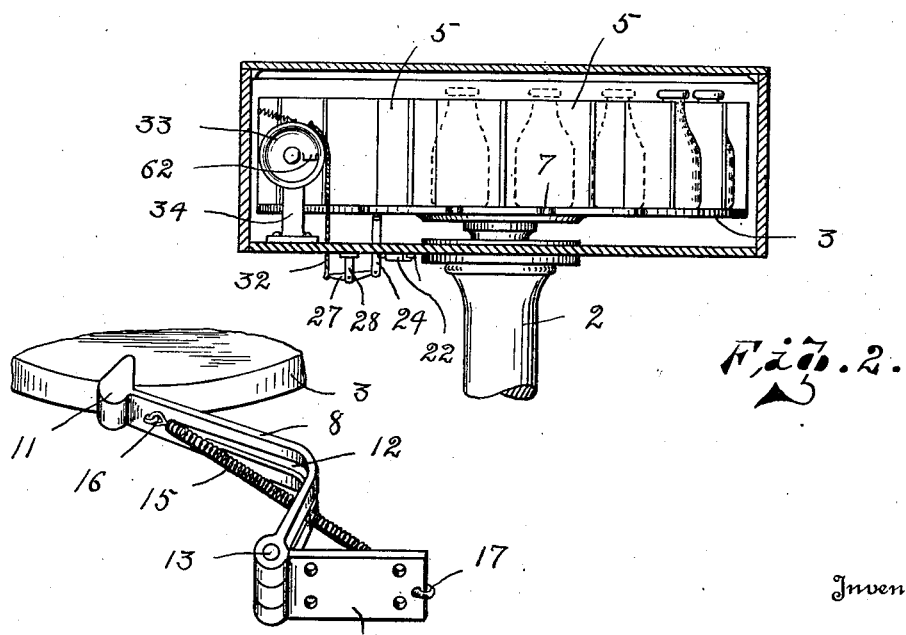

Patented Nov. 1, 1932

1,885,324

UNITED STATES PATENT OFFICE

BERNARD T. BJORNSON, OF DULUTH, MINNESOTA

VENDING MACHINE

Application filed April 5, 1930. Serial No. 441,846.

This invention relates to vending machines and the embodiment here illustrated refers particularly to such a machine adapted for use in the vending of bottled milk or the like.

The principal object of the invention is to provide a more practical, simple, and efficient device of this character than heretofore known.

Other objects and advantages of the novel construction will appear in the following description thereof.

Referring now to the accompanying drawings, forming part of this application, and wherein like reference characters indicate like parts:

Figure 1 is a top plan view of the open receptacle embodying the invention, portions of the front wall being shown in section;

Figure 2 is a front elevation of a portion of the interior of the device, the container of which is shown in section;

Figure 3 is an enlarged perspective view of the turntable operating mechanism;

Figure 4 is an enlarged diagrammatic perspective;

Figure 5 is a similar view of the coin controlled portion of the mechanism.

1 represents a rectangularly shaped boxlike housing which may be of wood or other desired material and accessible from on top in any desired manner and I have shown this receptacle as being mounted on a suitable pedestal 2 for convenience of access by patrons.

Within the housing 1 is mounted the turntable 3, having circumferential segmental shaped compartments 4 thereabouts, said compartments being closed at their innermost sides by the vertical circular wall 5, which wall forms a cylindrical compartment as at 6 within which ice or other cooling medium may be contained for keeping the material being vended at the desired temperature. This general arrangement of vending mechanism is known to be old in the art, and the instant invention resides particularly in the arrangement and novel combination of elements employed in the manipulation of same.

In the central circumferential edge of each compartment 4 is formed a notch 7 for consecutive engagement with the spring controlled operating dog 8. This dog is carried upon the inner face of the horizontally slidable door 9 which acts as a closure for the opening 10 in the front wall of the receptacle and through which opening the bottled milk is delivered or reached for by the patron.

The dog 8 is of L-shape, carrying at its extreme end the pointed head 11 for engagement within the notches 7 of the turntable. The body portion of this dog is slotted as at 12, and the opposite end hingedly connected as at 13 to the sustaining portion 14 thereof. This latter portion 14 is fixed to the inside of the door as by screws or other desired manner.

The contractile spring 15 for the dog is attached as at 16 adjacent the free end thereof and as at 17 to the fixed portion 14, it extending through the slot 12 as clearly illustrated in Figure 3, thus we have a dog that is biased at all times towards engagement within any one of the notches 7 in the turntable and will be automatically so engaged whenever a notch presents itself for such.

It is obvious that when the door 9 is slid open the dog 8 will revolve the turntable, it being engaged in one of the notches, and the extent of movement of the door and length of dog are so previously established as to present a succeeding compartment 4 to the shielded ramp 18 intermediate of said compartment and the opening 10 in the housing.

There is installed adjacent the path of the door 9 an upright shaft or pintle 19 carrying upon its lower end and beneath the floor of the container 1 a crank arm 20 and upon its upper end within the container the arm 21; this arm being normally disposed within the path of the door 9 so that at a predetermined time in respect to the final opening of the door 9 the arm 21 will be engaged by the door, the spindle 19 rotated, and the crank arm 20 swung so as to withdraw the spring bolt or catch 22, bolted to the under face of the floor of the receptacle, from the notch 23 in the vertical locking bolt 24 and allow same to be drawn upwardly as by the contractile helical spring 25 to engagement within one of the notches 7 in the turntable; this notch preferably being the second preceding one to that engaged by the dog 8. The locking bolt 24 is provided in its upper end with a suitable roller 26 for non-frictional engagement with the under side of the turntable when not in engagement within one of the notches 7.

The lever for operative control of the bolt 24 is illustrated at 27 as being pivotally mounted at 28 within the depending bracket 29 attached to the under side of the floor of the receptacle and which lever is pivotally connected as at 30 to the bolt 24 and connected as at 31 to the pulling line 32 mounted upon the sheave 33 in the upstanding bracket 34 within the receptacle 1.

There is attached as at 35 to the upper circumferential edge of the sheave 33 a contractile helical spring 36, its opposite end being fixed as at 37 to the inside of the wall of the receptacle 1 to counteract the pull of the spring 25 only so as to keep the line 32 fairly taut and the sheave 33 in its proper respective position for the operating mechanism hereinafter described.

From the foregoing it is evident that when the sheave 33 is rotated in for example anti-clockwise direction it will pull up on one end of the lever 27 and thus pull downwardly the bolt 24, the notch of which will be engaged by the catch 22 and there held until the door 9 is partially opened, and, as before stated, when this latter occurs the turntable will have been so moved that a notch 7 will appear over the bolt 24 and the latter being released by the action of the door will snap upwardly into same so as to lock the turntable in such position. The door 9 may then be returned either as by a spring or manually to its closed position when the dog 8 will be engaged in the next preceding notch 7 and there securely held by such engagement until it becomes possible to move the turntable another space or notch forwardly.

Now this freedom for action of the turntable is accomplished by the coin receiving mechanism which I will now proceed to describe.

Two vertically disposed spaced ramps are provided for coins, one preferably for five cent pieces and one for one cent pieces. These ramps are approached through the slots or openings 38 and 39 respectively, they occurring through the front wall of the receptacle 1. The housing for these ramps is not shown except in a general way in Figure 1. but the operation of the mechanism is clearly depicted in Figure 5. A vertically reciprocable jaw-like cross-head is illustrated at 40, the same carrying two vertically disposed flat shoes 41 and 42 carried upon its inwardly disposed sides 43; these latter working within vertical slots in the housing for the ramps, not shown. The upper innermost corners of the cross-head are provided with laterally projecting lugs 44 the object of which will be described later, and the vertically reciprocable pitman 45 is attached as at 46 to the cross-head 40 for the manipulation of same. An expansive helical spring 47 is installed about the pitman 45 intermediate of its upper end and the lower fixed bearing plate 48 so that upward stress is at all times present for holding the cross-head normally in its uppermost position. Below the bearing plate 48 the pitman 45 is bent outwardly and attached to the connecting rod 49 as at 50, and at the opposite end as at 51 to the operating crank arm 52 fixed to the rockable shaft 53.

Beneath the cross-head 40 when in its uppermost position and fixed at their lower ends to the sides of the housing for the coin control mechanism are the laterally adjustable wings or blades 55 and 56, the former controlling and subsequently controlled by the five cent pieces or nickels as they occur in the ramp therefor and the latter similarly co-related to the ramp for the one cent pieces or pennies; it being apparent that when either coin is dropped in its respective slot and ramp the same will fall downwardly and be engaged upon the adjustable hump within the ramp. These adjustable humps are illustrated at 57 on the blade 56 and at 58 on the blade 55. It is evident that the falling of either coin to engagement with its respective hump will in no way affect either of the blades until the cross-head 40 is brought down and engages the coins. It is also apparent that the proper coins must be within said ramps for the ultimate proper operation of the device; that is to say the device being first properly set, and assuming the price of a bottle of the liquid being vented is 7¢ a nickel will have been placed in the 5¢ ramp and two pennies in the 1¢ ramp, so that when the cross-head 40 descends the shoes 41 and 42 will engage the coins, thus placed within the ramps, simultaneously and as the cross-head is forced downwardly it will push the nickel on one side and the two pennies on the other side against the humps 57 and 58, thus forcing outwardly the free ends of the blades 55 and 56 and removing from the path of the depending ears or lugs 44 of the cross-head the inwardly bent ends 59 of the blades 55 and 56 which are there obviously for the purpose of acting as a stop by engaging the ears 44 of the cross-head when no coins, or the proper coins are not placed within the ramps for operation of the device.

Thus it will be seen that if the proper coins are placed within the ramps and the shaft 53 rotated for example by the lever 60 which protrudes through the front of the box in convenient position for the patron to operate vertically, the shaft 53 may be fully rocked or rotated and as it carries the backwardly projecting dog 61 thereupon which is positioned so as to engage the lug 62 fixed to the side of the sheave 33 it will rotate said sheave a predetermined distance in a counter-clockwise direction previously described as being necessary for the proper functioning of the turntable locking and operating mechanism. The dog 61 and lug is so proportioned and engaged that a full rocking of the shaft 53 will not only rotate the sheave 33 the desired distance but become automatically disengaged at the end of its stroke, thus permitting freedom of action of the automatic features previously described in connection with the turntable operating device, and also the free return of the coin controlled mechanism to its normal position ready for subsequent action of the device.

The return of the coin operating mechanism is accomplished by the expansive helical spring 47 forcing the cross-head 40 back into its uppermost position as illustrated in the drawings. It is apparent that the adjustable humps 57 and 58 provide means whereby adjustment of the machine is readily accomplished for coordination with the fluctuations in the price of milk or the liquid being vended.

In view of the incorporation of the operation of the device in the above description, it is deemed sufficient to further say that the device having once been properly set and provided with the bottles to be vended, the patron places the required coins in the two slots 38 and 39, pulls down the lever 60 and releases same which frees the turntable for operation, and then on sliding the door 9 to open position the turntable will be revolved presenting a compartment holding a bottle to the inner terminus of the ramp 18 where it is accessible to the patron, simultaneously with again locking the turntable against rotation; and the door on being returned to closed position the machine is set for subsequent operation.

Having thus described my invention, what I claim and desire to secure by Letters Patent, is:

1. A coin-controlled vending machine comprising in combination a housing, a turntable within the housing carrying circumferentially disposed compartments thereupon, a door controlled exit in the housing for consecutive registration with said compartments, means attached to the door and successively to the compartments whereby opening of the door will rotate the turntable, locking means for the turntable registrable successively with each compartment made effective by the opening of the door, and manually controlled means for unlocking the turntable.

2. A coin controlled vending machine comprising in combination a housing, a turntable within the housing carrying a plurality of circumferentially arranged compartments, a door controlled exit in the housing for consecutive registration with said compartments, means whereby opening of the door will rotate the turntable so that the next succeeding compartment will register with the exit, locking means for said conveyor, means operated by the door causing said locking means to function in holding the turntable in said rotated position, and means for unlocking said locking means.

3. A vending machine comprising a housing having an opening therein provided with a closure, a turntable carrying a series of circumferentially arranged compartments within said housing successively registrable with said opening, means attached to the closure and successively to each compartment whereby opening of the door will cause the next succeeding compartment to register with the opening, means for locking the compartments against rotation while the door is open or closed, and manually controlled means for unlocking the locking means.

4. Operating mechanism for a coin controlled vending machine having a turntable with circumferentially disposed carrying compartments thereupon each compartment having a notch therein, comprising a housing inclosing said turntable and mechanism, a slidable door for said housing, means successively engageable with said notches whereby opening of the door will rotate the turntable, means engageable successively in said notches for locking the turntable, said latter means being controlled by the action of the door simultaneously with the rotation of the turntable, and manually controlled means for unlocking the locking means.

5. Operating mechanism for a coin controlled vending machine having a turntable with circumferentially disposed carrying compartments thereupon, comprising a housing inclosing said turntable and mechanism, said turntable having equally spaced circumferential notches thereabouts, reciprocable means attached to the door for successive engagement within the notches for turning the turntable when the door is opened, locking means comprising a vertically reciprocable member for successive engagement within said notches, and means operable by the door for releasing of said vertically reciprocable means.

In testimony whereof I affix my signature.
BERNARD T. BJORNSON.